(12) United States Patent
Tokuhara

(10) Patent No.: US 10,410,254 B2
(45) Date of Patent: Sep. 10, 2019

(54) BILLING ELECTRONIC ADVERTISEMENT SYSTEM

(75) Inventor: Tsunemi Tokuhara, Kodaira (JP)

(73) Assignee: Tsunemi Tokuhara, Kodaira-shi (JP)

( * ) Notice: Subject to any disclaimer, the term of this patent is extended or adjusted under 35 U.S.C. 154(b) by 1110 days.

(21) Appl. No.: 14/239,414

(22) PCT Filed: Oct. 7, 2011

(86) PCT No.: PCT/JP2011/073221
§ 371 (c)(1),
(2), (4) Date: Feb. 18, 2014

(87) PCT Pub. No.: WO2013/051153
PCT Pub. Date: Apr. 11, 2013

(65) Prior Publication Data
US 2014/0236736 A1    Aug. 21, 2014

(51) Int. Cl.
G06Q 30/02        (2012.01)
G06Q 30/04        (2012.01)

(52) U.S. Cl.
CPC ..... *G06Q 30/0273* (2013.01); *G06Q 30/0241* (2013.01); *G06Q 30/0272* (2013.01); *G06Q 30/04* (2013.01)

(58) Field of Classification Search
CPC . G06Q 30/02; G06Q 30/0273; G06Q 30/0272
See application file for complete search history.

(56) References Cited

U.S. PATENT DOCUMENTS

2003/0105669 A1    6/2003    Tsuchiya
2009/0150253 A1*   6/2009    Williams .............. G06Q 30/02
                                                 705/26.1

(Continued)

FOREIGN PATENT DOCUMENTS

JP    2001-084300    3/2001
JP    2002-133312    5/2002

(Continued)

OTHER PUBLICATIONS

IBM, "Computer Vision Based Targeted Advertising and Marketing" (published in The IP.com Prior Art Database, Nov. 2, 2006 ). (Year: 2006).*

(Continued)

*Primary Examiner* — James M Detweiler
*Assistant Examiner* — Patrick Kim
(74) *Attorney, Agent, or Firm* — Wenderoth, Lind & Ponack, L.L.P.

(57) ABSTRACT

An electronic advertisement system including an advertiser-side computer for sending billing tag-attached electronic advertisement data describing a billing condition, a multitude of member-side terminal computers, and an advertisement agency-side administration computer connected via the Internet. Under the control by the advertisement agency-side administration computer, the billing tag-attached electronic advertisement data outputted from the advertiser-side computer is added with the corrected billing tag and the resultant data is sent to the respective member-side terminal computers. The member-side terminal computer determines whether the corrected billing condition of the received electronic advertisement data is achieved or not by analyzing the input data from the electronic device. The advertisement agency-side administration computer counts the corrected billing condition determination data from the member-side terminal computer and generates billing charge data to be processed by the advertiser-side computer.

7 Claims, 14 Drawing Sheets

(56) References Cited

U.S. PATENT DOCUMENTS

| | | | | |
|---|---|---|---|---|
| 2009/0197582 A1* | 8/2009 | Lewis | ..................... | H04W 4/02 455/414.2 |
| 2009/0273687 A1* | 11/2009 | Tsukizawa | .............. | G06F 3/012 348/222.1 |
| 2010/0191631 A1* | 7/2010 | Weidmann | .............. | G06F 3/013 705/34 |
| 2010/0280876 A1* | 11/2010 | Bowra | ............... | G06Q 30/0242 705/14.41 |

FOREIGN PATENT DOCUMENTS

| | | |
|---|---|---|
| JP | 2003-150861 | 5/2003 |
| JP | 2011-197475 | 10/2011 |

OTHER PUBLICATIONS

International Search Report dated Dec. 6, 2011 in International Application No. PCT/JP2011/073221.

\* cited by examiner

BILLING ELECTRONIC ADVERTISEMENT SYSTEM

TECHNICAL FIELD

The present invention relates to an Internet-ready electronic advertisement system by which an advertisement rate is billed to a sponsor only when a predetermined advertisement effect desired by the sponsor is confirmed.

BACKGROUND ART

An electronic signage has been known through which various pieces of video and character information are transmitted through the Internet. One of known electronic signages is configured to provide a camera and, based on the video taken by the camera, an image of a face of a customer is analyzed to switch the advertisement based on this analysis result. An information processing apparatus has been also known that includes a video analysis means to extract the expression of a person taken by a digital camera to quantify the expression (see Patent Publication 1 for example). A program technique has been conventionally known by which a computer program is used to generate, based on video data, a two-dimensional or three-dimensional object to control the generated object (see Patent Publication 2 for example). Further, an electronic advertisement system has been conventionally known by which an advertisement rate is billed to a sponsor only when a predetermined advertisement effect desired by the sponsor can be confirmed (see Patent Publication 3 for example).

PRIOR ART PUBLICATION

Patent Publication

Patent Publication 1: Japanese Patent Publication No. 355823
Patent Publication 2: Japanese Laid-Open Patent Publication No. 2002-366973
Patent Publication 3: Japanese Patent Publication No. 4698770

SUMMARY OF THE INVENTION

A conventional billing electronic advertisement system displays advertisement video on a large display to an unspecified number of passersby as a target. Thus, the conventional billing electronic advertisement system is not ready for the advertisement for the owners of many Internet terminals such as small personal computers and mobile phones. It is an objective of the present invention to provide a billing-type electronic advertisement system that is suitable for providing advertisement to many Internet terminal computers.

In order to achieve the above objective, the present invention provides a system in which an Internet provides a connection among: an advertiser-side computer for generating billing tag-attached electronic advertisement data including a tag consisting of information describing a billing condition; a multitude of member-side terminal computers including an electronic device that acquires the situation in front of a screen as input data; and an advertisement agency-side administration computer that receives the billing tag-attached electronic advertisement data and that generates a corrected billing tag obtained by deleting a counting part from the billing condition. Under the control by the advertisement agency-side administration computer, the electronic advertisement data outputted from the advertiser-side computer is added with the corrected billing tag and the resultant data is sent to the member-side terminal computer. The electronic advertisement data is then displayed on the screen of the member-side terminal computer. The member-side terminal computer includes therein an advertisement data reception processing program for processing the electronic advertisement data. The program has an input video analysis means that determines whether the corrected billing condition of the received electronic advertisement data is achieved or not by analyzing the input data from the electronic device. The program included in the advertisement agency-side administration computer has a program to collect the corrected billing condition determination data sent from the member-side terminal computer to determine whether the billing condition of the electronic advertisement data is achieved or not. When the billing condition is achieved, billing charge data is generated that is to be processed by the advertiser-side computer.

According to the present invention, a program for preparing the billing tag-attached electronic advertisement data is provided in a website of the advertisement agency-side administration computer. The billing tag-attached electronic advertisement data preparation program is downloaded from the website to the advertiser-side computer.

According to the present invention, the website of the advertisement agency-side administration computer has a billing charge data adjustment program to process the billing charge data to adjust the billing described in the data. The program is downloaded from the website to the advertiser-side computer.

Also according to the present invention, the website of the advertisement agency-side administration computer has the advertisement data reception processing program that has the input video analysis means and that processes the corrected billing tag-attached advertisement data. The advertisement data reception processing program is downloaded from the website to the member-side terminal computer.

Also according to the present invention, the member-side terminal computer is registered in a member list database of the website of the advertisement agency-side administration computer.

Also according to the present invention, the billing condition is that the electronic advertisement data display screen of the member-side terminal computer is watched by the computer owner for a predetermined time or more and the number of member-side terminal computers satisfying the watch time exceeds a predetermined number.

Also according to the present invention, the corrected billing condition is that the electronic advertisement data display screen of the member-side terminal computer is watched by the computer owner for the predetermined time or more.

According to the present invention, advertisement can be effectively provided to a multitude of owners of the Internet terminals without causing a risk where a sponsor must pay an advertisement rate for an ineffective advertisement.

DETAILED DESCRIPTION OF THE INVENTION

The following section will describe the configuration of the present invention in detail with reference to the attached drawings.

Figure 1:
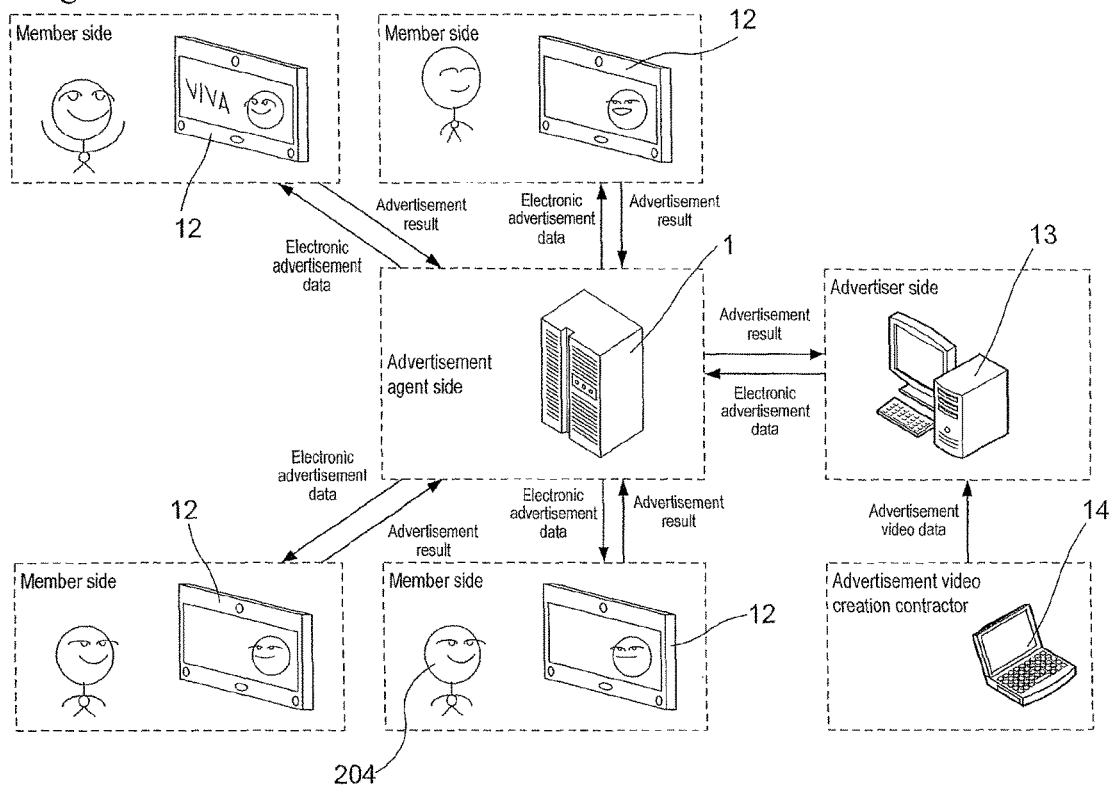
FIG. 1 illustrates the present invention.
Figure 3:
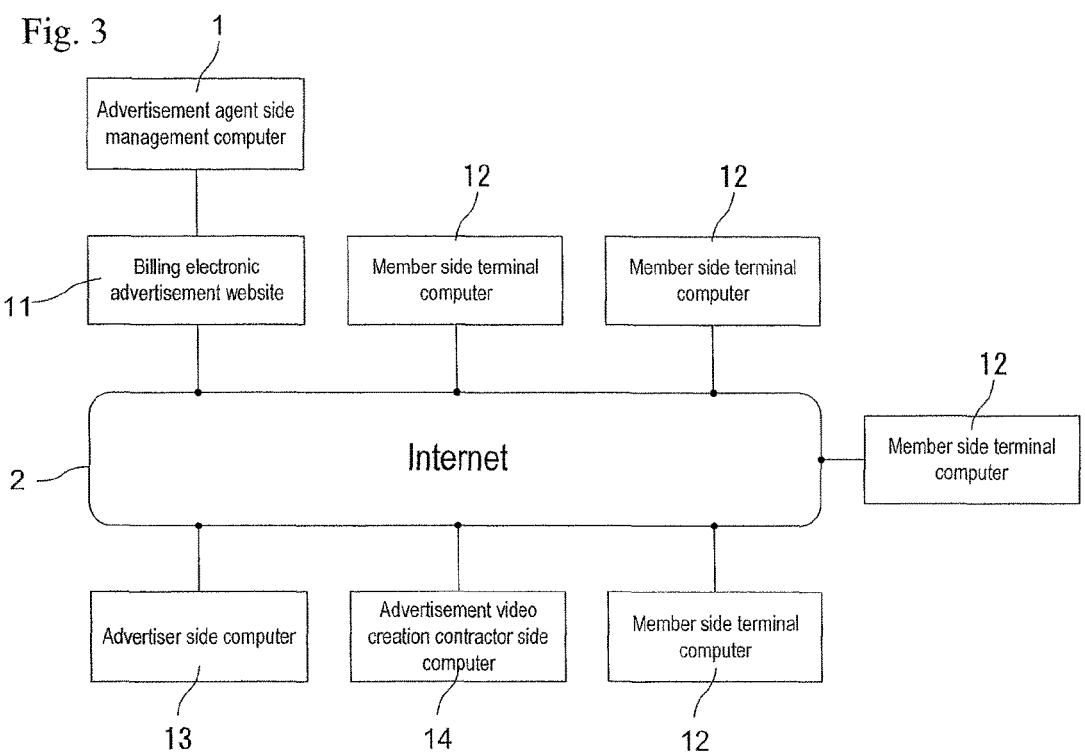
FIG. 3 is a block diagram illustrating the present invention.
Figure 4:
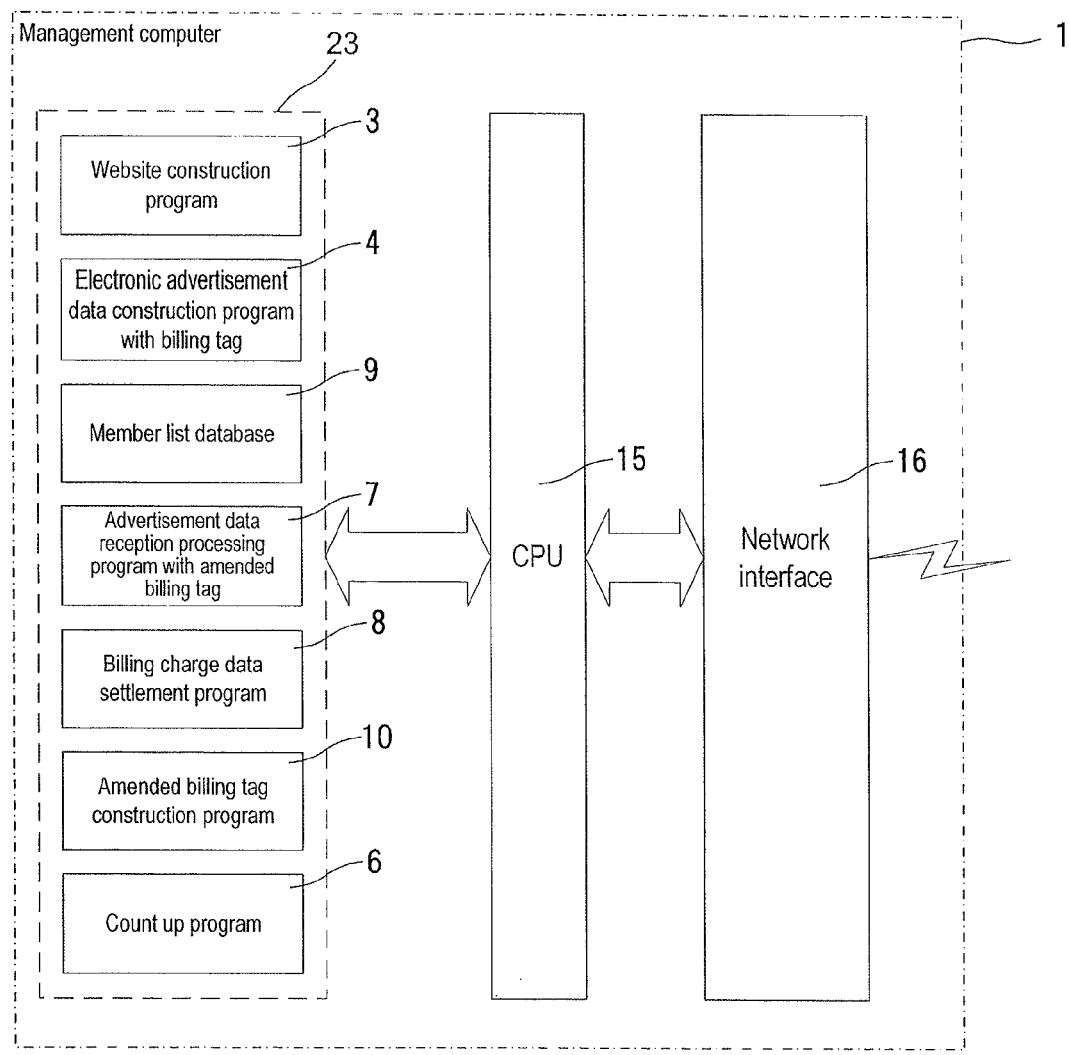
FIG. 4 is a block diagram illustrating the present invention.

FIG. 1 and FIG. 3 illustrate the hardware configuration of this system. An advertisement agency-side administration computer 1, which administers the system, is configured by a workstation. The administration computer 1 has a central processing unit 15 that is connected, as shown in FIG. 4, to the Internet 2 via a network interface 16 and that builds a billing electronic advertisement website 11 for administering this system to be publicized through the Internet 2 by a website building program 3. The administration computer 1 has a storage apparatus 23 that stores therein a billing tag-attached electronic advertisement data preparation program 4, a counting program 6, a corrected billing tag-attached advertisement data reception processing program 7, a billing charge data adjustment program 8, a member list database 9, a corrected billing tag preparation program 10, and various other programs and data required to administer this system.

Figure 2:
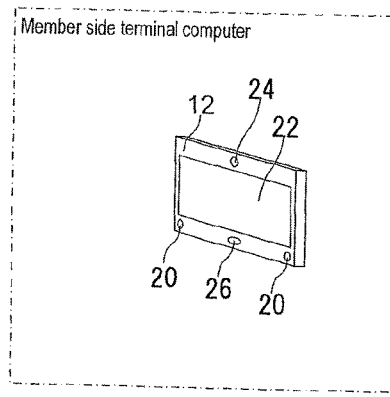
FIG. 2 illustrates a terminal computer used in the present invention.
Figure 5:
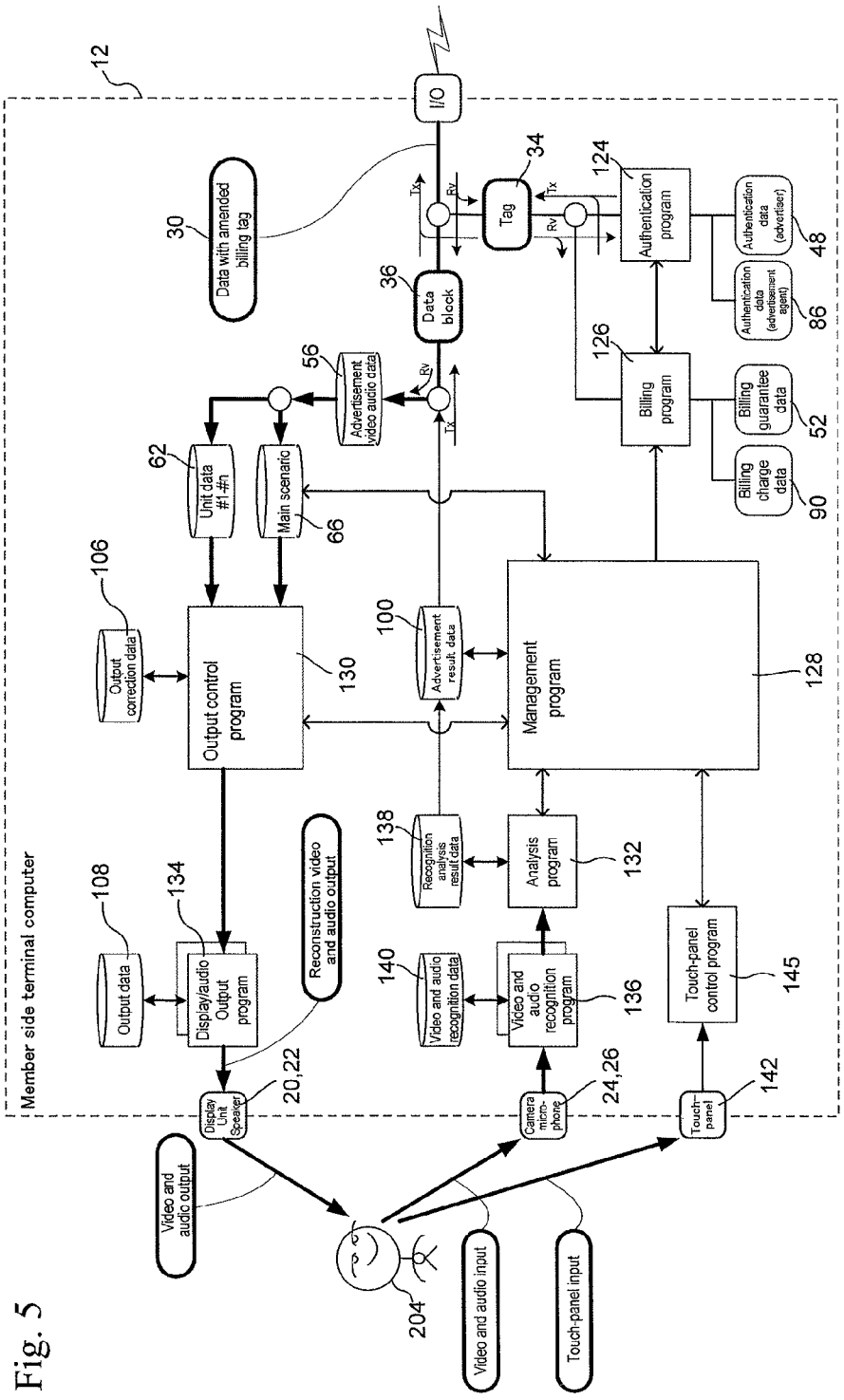
FIG. 5 is a block diagram illustrating the present invention.

The Internet 2 is connected to a multitude of member-side terminal computers 12 via various networks. The member-side terminal computer 12 is composed of a personal computer, a mobile phone including therein a computer, and a mobile information terminal. Each member-side terminal computer 12 includes, as shown in FIG. 2, a speaker 20, a microphone 26, a digital video camera 24 for taking a moving image and a still image, and a video display input screen 22 including a touch panel 142. The touch panel 142 is configured, as shown in FIG. 5, to be controlled by a touch panel control program 145. The Internet 2 is connected, via various networks, to a plurality of advertiser-side computers 13 and a digital advertisement video preparation agency-side computer 14.

Figure 7:
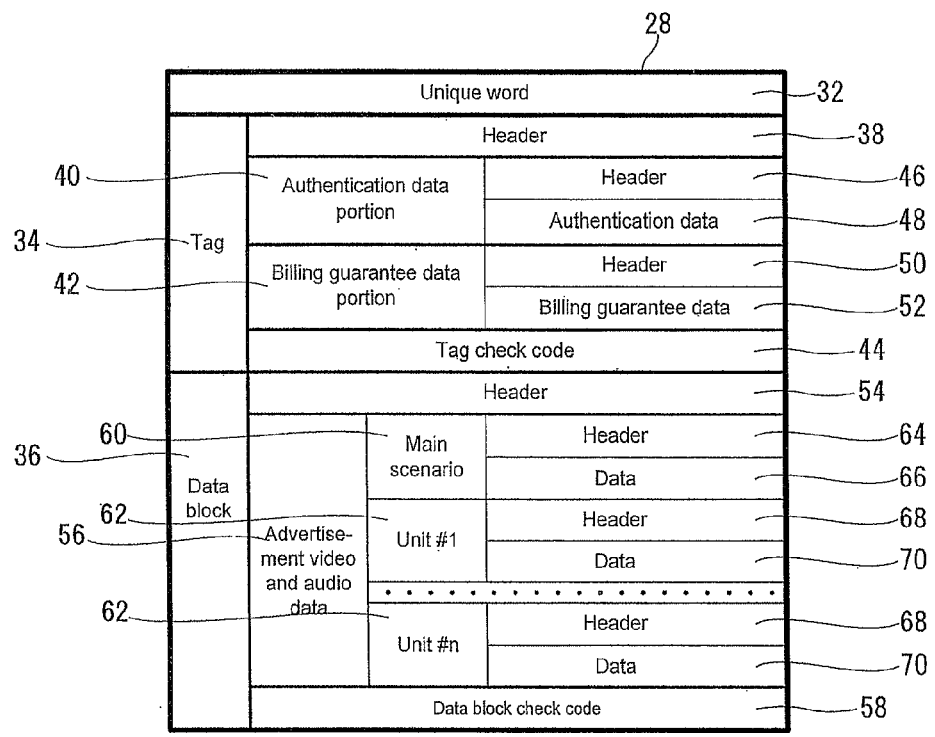
FIG. 7 illustrates the present invention.
Figure 8:
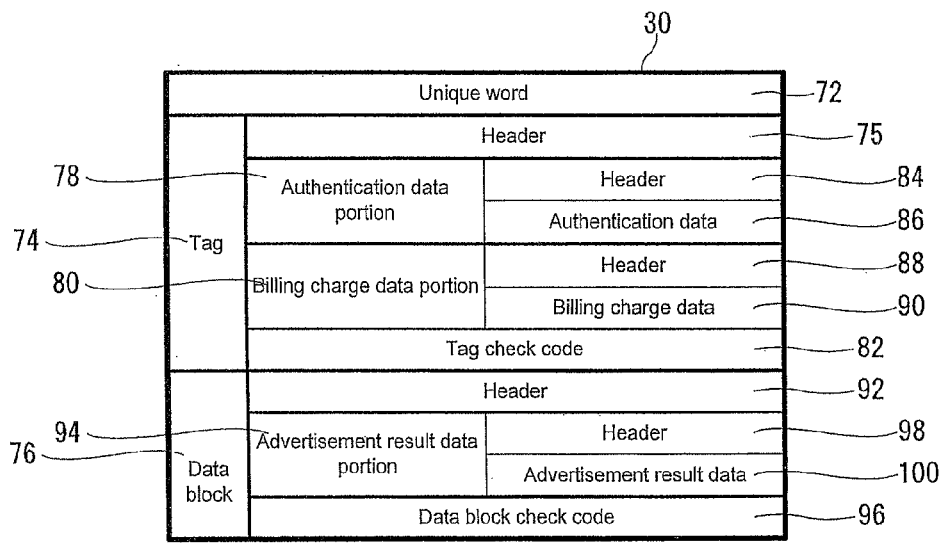
FIG. 8 illustrates the present invention.

FIGS. 7 to 10 illustrate tag-attached data formats used in this system. FIG. 7 illustrates billing tag-attached electronic advertisement data 28 sent from the advertiser-side computer to the advertisement agency-side administration computer. FIG. 8 illustrates billing tag-attached data 30 sent from the advertisement agency-side administration computer to the advertiser-side computer.

Figure 9:
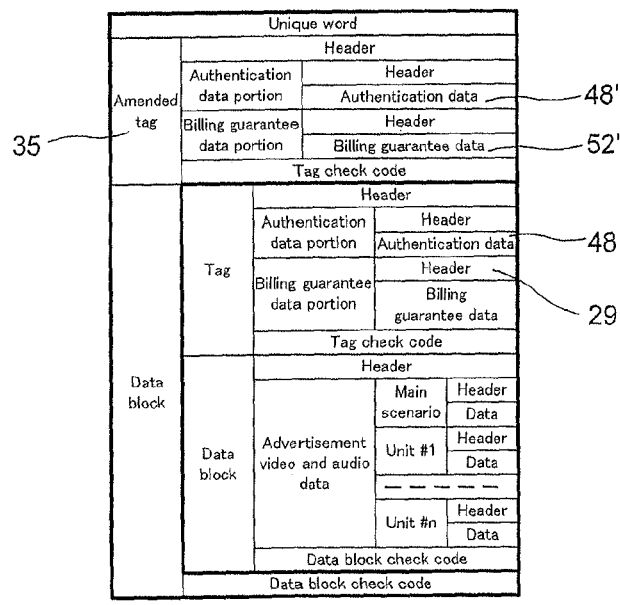
FIG. 9 illustrates the present invention.
Figure 10:
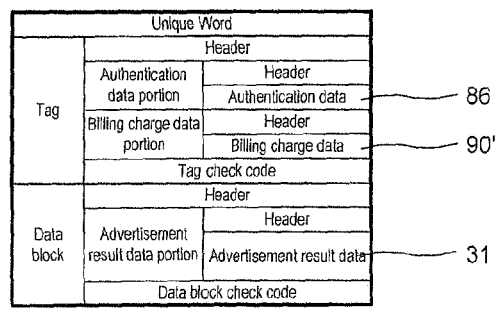
FIG. 10 illustrates the present invention.

FIG. 9 illustrates corrected billing tag-attached electronic advertisement data 29 sent from the advertisement agency-side administration computer to the member-side terminal computer. FIG. 10 illustrates corrected billing tag-attached data 31 sent from the member-side terminal computer to the advertisement agency-side administration computer. The pieces of tag-attached data shown in FIGS. 8 and 10 have the same data structure. The pieces of tag-attached electronic advertisement data 28 and 29 shown in FIG. 7 and FIG. 9 have the same data structure except for that the tag-attached electronic advertisement data 29 of FIG. 9 is added with the corrected tag 35. In FIG. 7, the data 28 is composed of a unique word 32, a tag 34, and a data block 36. The tag 34 is composed of a header 38, an authentication data section 40, a billing guarantee data section 42, and a tag check code 44. The authentication data 40 is composed of a header 46 and authentication data 48. The billing guarantee data section 42 is composed of a header 50 and billing guarantee data 52.

The data block 36 is composed of a header 54, advertisement video/audio data 56, and a data block check code 58. The advertisement video/audio data 56 is composed of a main scenario 60 and a multitude of pieces of unit data 62. The main scenario 60 is composed of a header 64 and data 66. Each unit of the unit data 62 is composed of a header 68 and data 70. The unique word 32 is composed of an identification synchronization code of the billing tag-attached data 28. The header 38 shows the byte count of the tag 34. The authentication data 48 is composed of an advertiser ID code and an advertisement agency ID code. In FIG. 9, the authentication data 48' is composed of the advertisement agency ID code and the member terminal ID code.

The header 50 shows the byte count of the billing guarantee data 52. The billing guarantee data 52 is composed of the serial number, the billing amount, and the billing condition of the billing tag-attached data 28. The billing condition is a condition for providing an advertisement effect desired by the advertiser such as "the number of members who have watched the advertisement video screen for a period of 0.5 second or more exceeds 100,000". In FIG. 9, the billing guarantee data 52' has the corrected billing condition of "the advertisement video screen is watched for a period of 0.5 second or more" for example. The tag check code 44 is composed of the tag header 38, the authentication data section 40, and the error detection correction code of the billing guarantee data section 42. The header 54 is composed of the byte count of the data block 36. The header 64 is composed of the byte count of the main scenario 60. The data 66 is composed of the execution procedure of the unit data 62 and the link information to the unit data 62.

The header 68 shows the byte count of each unit data 62. The data 70 is composed of the video/audio data of the unit data 62. The data block check code 58 is composed of the header 54 of the data block 36 and the error detection correction code of the advertisement video data 56. In FIG. 8, the tag-attached data 30 is composed of a unique word 72, a tag 74, and a data block 76. The tag 74 is composed of a header 75, authentication data 78, billing charge data 80, and a tag check code 82. The authentication data section 78 is composed of a header 84 and authentication data 86. The billing charge data section 80 is composed of a header 88 and billing charge data 90. The data block 76 is composed of a header 92, an advertisement result data section 94, and a data block check code 96.

The advertisement result data section 94 is composed of a header 98 and advertisement result data 100. The unique word 72 is composed of the identification synchronization code of the billing tag-attached data 30. The header 75 shows the byte count of the tag 74. The header 84 shows the byte count of the authentication data 86. The authentication data 86 is composed of the advertisement agency ID code and the advertiser ID code. In FIG. 10, the authentication data 86 is composed of a member terminal ID code and an advertisement agency ID code. The header 88 shows the byte count of the billing charge data 90. The billing charge data 90 is composed of the serial number, the billing amount, and the billing condition of the billing tag-attached data 28.

In the corrected billing tag-attached data 31 of FIG. 10, the billing charge data 90' is composed of the serial number of the corrected billing tag-attached electronic advertisement data 29 and the corrected billing condition.

The tag check code 82 is composed of the header 75 of the tag 74, the authentication data 78, and the error detection correction code of the billing charge data section 80. The header 92 shows the byte count of the data block 76. The header 98 shows the byte count of the advertisement result data 100. The advertisement result data 100 is composed of a recognition result, an advertisement effect, and a log, respectively. The data block check code 96 is composed of the header of the data block 76 and the error detection correction code of the advertisement result data section 94.

Figure 11:
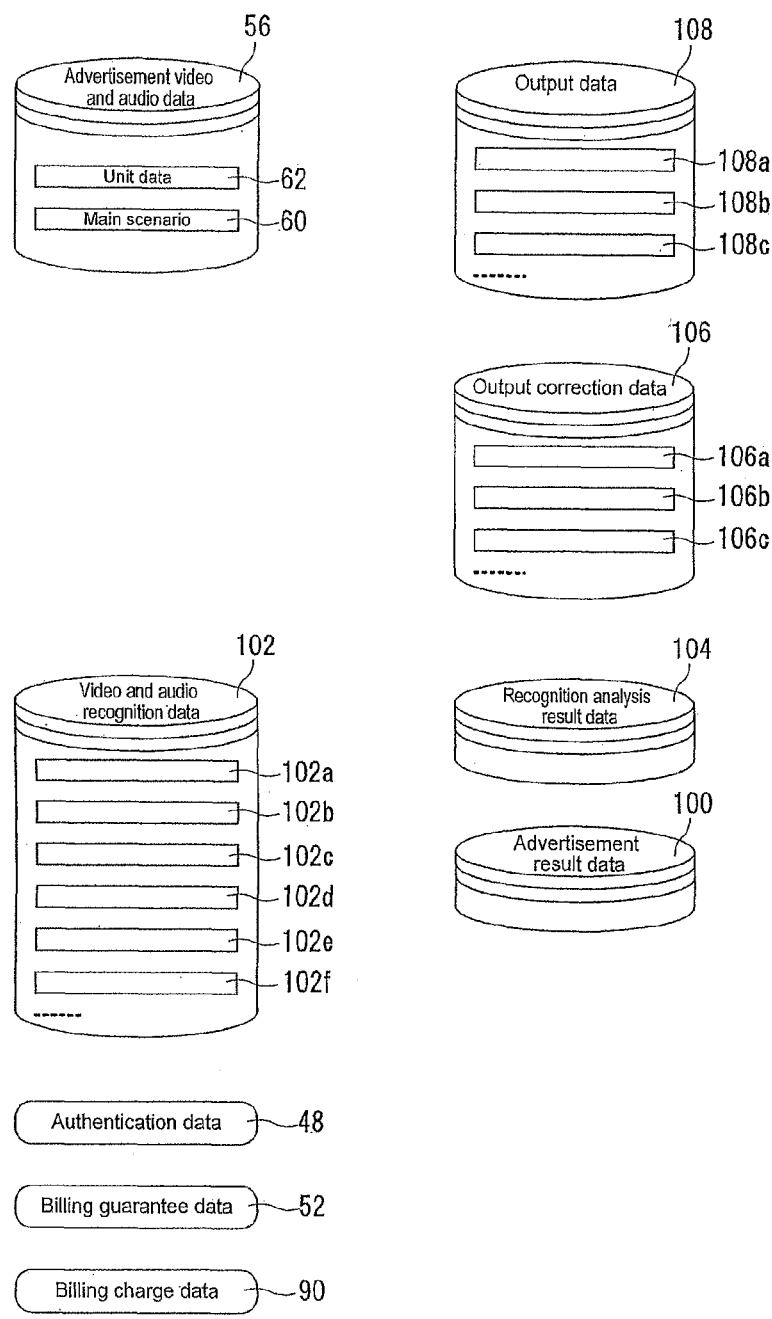
FIG. 11 illustrates the present invention.

FIG. 11 illustrates the structure of the data used in this system.

Video/audio recognition data 102 shown in FIG. 11 has the following data structure.

Background data 102a is video data obtained from a camera input other than video information considered to be a person image and is background extraction data subjected to a statistics processing for example.

Person model data 102b is a person model having a universal feature amount obtained from a multitude of person images through a statistics processing for example.

Face model data 102c is a face model having a universal feature amount obtained from the face images of a multitude of persons through a statistics processing for example.

Eye/pupil model data 102d is an eye/pupil model having a universal feature amount obtained from the eye/pupil images of a multitude of persons through a statistics processing for example.

Smiling face model data 102e is a smiling face model having a universal feature amount obtained from the smiling face images of a multitude of persons through a statistics processing for example.

Face object data 102f is various pieces of object recognition information for the respective face tracking processing units. The face object data 102f is composed of the face object data of the members. The face object data of the members are the history and recognition information of the object recognition of the member face tracking processing. In the above description, the term "feature amount" means a numerically-converted feature of a shape of a person, face, eye, smiling face for example and shows the relative position, shape, the interrelation, and the change speed for example of the respective parts of the person face (e.g., wrinkles, eyelid, pupil, lip, teeth).

Recognition analysis result data 104 has the following data structure.
  Recognition analysis data serial No.: 00000001
  Project code: PrjctCd00-01
  Electronic advertisement medium No.: EastStreet97
  Date: 20100808-23:00.00-20100808-23:59.59
  Screen watch time: xxxx The advertisement result data 100 has the following data structure.
  Advertisement result data:
  Billing tag-attached data serial No. KTD0001
  Electronic advertisement medium No.: EastStreet97
  Date: 20100808-23:00.00-20100808-23:59.59
  Screen watch time: xxxx Output correction data 106 has respective blocks 106a, 106b, and 106c each of which has the following data structure.
  Block 106a:
  Output correction data serial No.: 00000001
  Project code: PrjctCd00-01
  Scenario code: ABCD-0001
  Scenario script link information: For-stimulation corrected video/audio information
  Parent link information: 00000001
  Child link information: 00000003
  Video/audio data
  Block 106b:
  Output correction data serial No.: 00000002
  Project code: PrjctCd00-01
  Scenario code: ABCD-0001
  Scenario script link information: For-stimulation corrected video/audio information
  Parent link information: 00000001
  Child link information: 00000003
  Video/audio data
  Block 106c:
  Output correction data serial No.: 00000003
  Project code: PrjctCd00-01
  Scenario code: ABCD-0001
  Scenario script link information: For-stimulation corrected video/audio information
  Parent link information: 00000001
  Child link information: None
  Video/audio data Output data 108 has respective blocks 108a, 108b, and 108c each of which has the following data structure.
  Block 108a:
  Output data serial No.: T00000001
  Preparation process ID: PC00001
  Video/audio link address information: T00000002, T00000003
  Video/audio data
  Block 108b:
  Output data serial No.: T00000002
  Preparation process ID: PC00001
  Video/audio link address information: T00000003
  Video/audio data mode: MPEG4
  Video/audio data
  Block 108c:
  Output data serial No.: T00000003
  Preparation process ID: PC00001
  Video/audio link address information: None
  Video/audio data mode: MPEG4
  Video/audio data:

The authentication data 48 has the following data structure.
  Authentication data:
  Advertiser ID code, advertisement agency ID code The billing guarantee data 52 has the following data structure.
  Billing tag-attached data serial No.: KTD0001
  Billing amount: ¥200,000—

Billing condition:
Screen watch time: 0.5 second
Threshold value of watch time—satisfying persons: N
The billing charge data 90 has the following data structure.
Billing tag-attached data serial No.: KTD0001
Billing amount: ¥200,000—
Billing condition:
Screen watch time: 0.5 second
Threshold value of watch time—satisfying persons: N
Determination result:

Next, the following section will describe an operation to administer the system through the advertisement agency-side website.

First, the advertisement agency-side administrator collects, through the website 11, the Internet terminal members cooperating with the billing electronic advertisement system. A member contract is made between the advertisement agency side and the member side. A member providing cooperation can receive a predetermined amount of points for example from the advertisement agency side. The member list database 9 of the advertisement agency-side administration computer 1 records data for identifying the members. When a member contract is established, the corrected billing tag-attached advertisement data processing program 7 is downloaded from the administration computer 1 to the member-side terminal computer 12. Then, the advertisement data processing program 7 allows the member-side terminal computer 12 to build an electronic advertisement presentation system as shown in FIG. 5.

Figure 6:
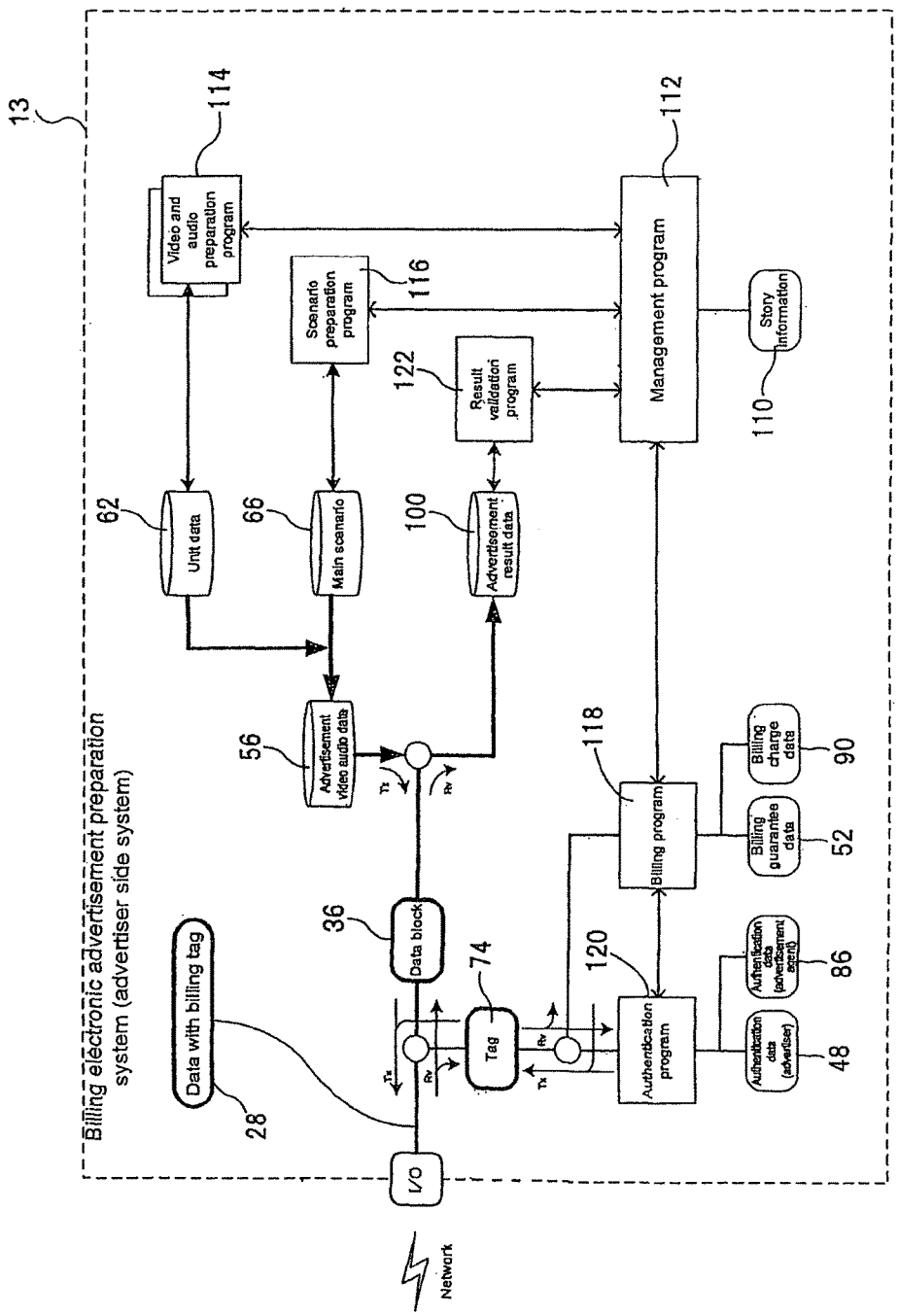
FIG. 6 is a block diagram illustrating the present invention.

When the advertiser applies for the use of the billing electronic advertisement through the website 11, then the billing tag-attached electronic advertisement data preparation program 4 including an administration program 112 is downloaded from the advertisement agency-side administration computer 1 to the advertiser-side computer. By these programs, the billing electronic advertisement preparation system as shown in FIG. 6 is built in the advertiser-side computer 13. The advertiser-side computer 13 prepares the billing electronic advertisement based on the advertisement video/audio data provided from the computer 14 of the advertisement video preparation agency via the Internet 2. The following section will describe the operation by the advertiser-side computer 13 to prepare a billing electronic advertisement with reference to the flowchart shown in FIG. 12.

Figure 12:
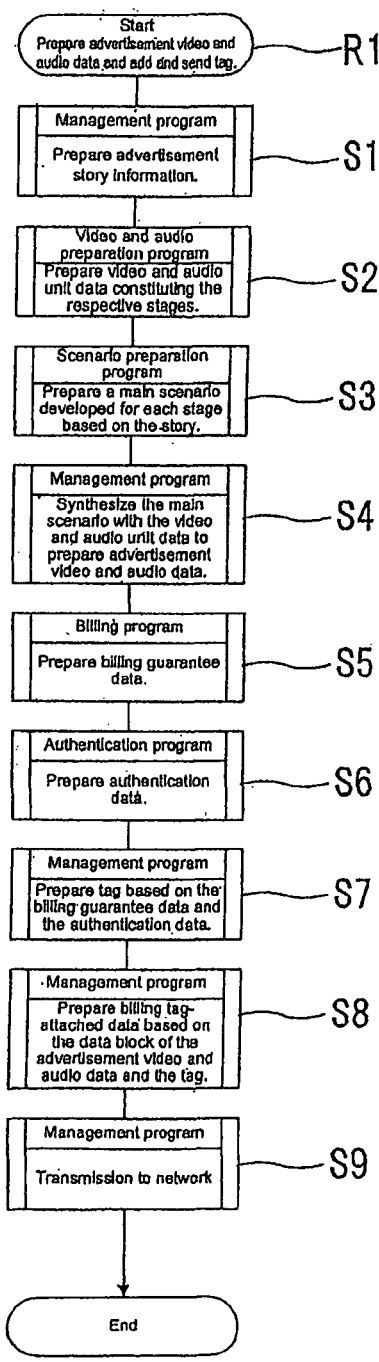
FIG. 12 is a flowchart illustrating the operation of the present invention.

In FIG. 12, the operation by the advertiser-side system 13 with regard to the preparation, tag addition, and transmission of the advertisement video/audio data is started with a label R1. The advertiser-side system 2 in Step S1 allows the administration program 112 to prepare story information 110 based on the advertisement story information. This story information 110 is composed of a plurality of stages (segments).

Next, in Step S2, a video/audio preparation program 114 prepares the video/audio unit data 62 constituting the respective stages based on the respective stages of the story information 110.

Next, in Step S3, a scenario preparation program 116 prepares, based on the story information, the main scenario 66 developed for the respective stages. Next, in Step S4, the administration program 112 combines the main scenario 66 with the video/audio unit data 62 to prepare the advertisement video/audio data 56.

Next, in Step S5, a billing program 118 prepares the billing guarantee data section 52 based on the input data regarding the billing guarantee. Next, in Step S6, an authentication program 120 prepares the authentication data 48 based on the input data regarding authentication. Next, in Step S7, the administration program 112 prepares the tag 34 based on the billing guarantee data 52 and the authentication data 48.

Next, in Step S8, the administration program 112 generates billing tag-attached data 28 based on the advertisement video/audio data block 36 and the tag 34. Next, in Step S9, the administration program 112 sends the billing tag-attached data 28 to the billing electronic advertisement presentation system 6 via a network and completes the transmission processing for the advertiser-side computer 13.

Figure 13:
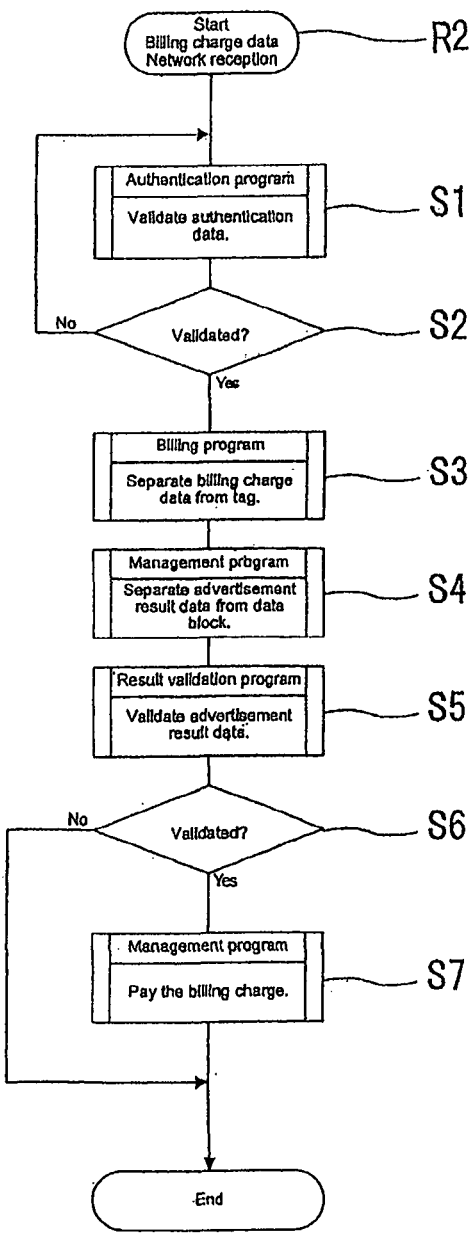
FIG. 13 is a flowchart illustrating the operation of the present invention.

FIG. 13 illustrates the processing in which the advertiser-side system of the advertiser-side computer 13 receives the billing charge data. In FIG. 13, the advertiser-side system starts the network reception processing for the billing charge data from the label R2. The advertiser-side system in Step S1 allows the authentication program 120 to verify the authentication data 86 received from the administration computer 1.

Next, the authentication program 120 in Step S2 determines whether the authentication data 86 is verified or not. When Step S2 determines "No", then the processing returns to Step S1. When Step S2 determines "Yes", then the billing program 118 in Step S3 separates the billing charge data 90 from the tag 74. and in step S4 the advertisement result data is separated from the data block. Next, a result verification program 122 in Step S5 verifies the advertisement result data 100. Next, the result verification program 122 in Step S6 determines whether the advertisement result data 100 is verified or not. When Step S6 determines "No", the advertiser-side system 2 completes the processing. When the result verification program 122 determines "Yes" in Step S6, then the administration program 112 in Step S7 adjusts the billing charge and completes the processing.

Next, the following section will describe the reception processing operation by the advertisement agency-side administration computer 1. When the advertisement agency-side administration computer 1 receives the billing tag-attached electronic advertisement data 28 from the advertiser-side computer 13 via the Internet 2, then the administration computer 1 prepares the corrected tag 35 for which the billing condition is corrected as shown in FIG. 9 to a billing condition suitable for a single member-side terminal computer 12 and prepares the corrected billing tag-attached electronic advertisement data 29 for the member-side terminal computer 12. When the billing condition is "the number of members who have watched the advertisement video screen for a period of 0.5 second or more exceeds 100,000", the billing condition is corrected by deleting the counting part to "the advertisement video screen is watched for a period of 0.5 second or more".

Figure 18:
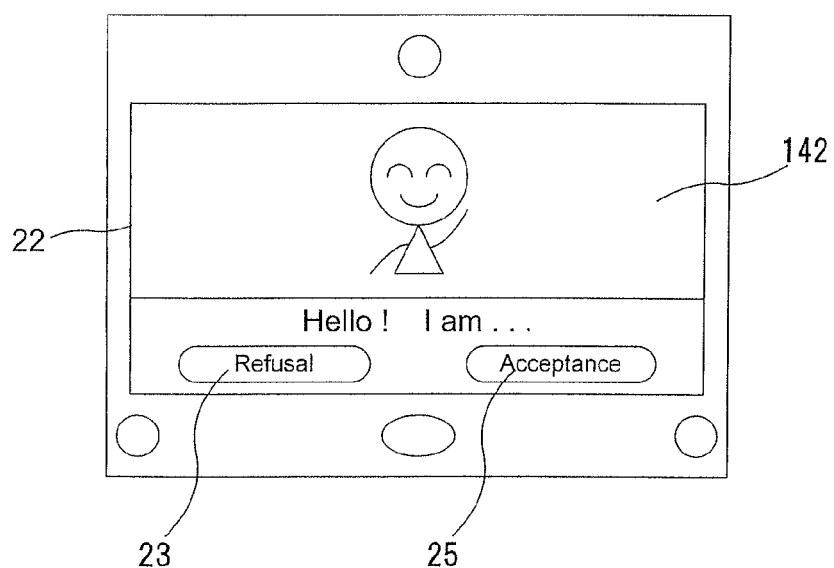
FIG. 18 illustrates the present invention.

Next, the advertisement agency-side administration computer 1 sends, via the Internet 2, the corrected billing advertisement electronic data 29 to the respective member-side terminal computers 12. This corrected billing electronic advertisement data 29 is sent to the respective member-side terminal computers 12 for about 5 seconds at an interval of every 30 minutes. FIG. 18 illustrates the electronic advertisement data 29 sent from the advertisement agency-side administration computer 1 to each member-side terminal computer 12 and the member-side terminal computer 12 displays an initial screen. This initial screen data is set by the member side in advance so as to be displayed one time a day. The initial screen displays buttons of "reject" 23 and "accept" 25. When the member touches the touch panel 142 and depresses the "accept" button 25, the member-side terminal computer 12 displays the animated video of the advertisement video/audio data. When the "reject" button 23 is depressed, the transmission to the member-side terminal computer 12 is stopped and the video on the initial screen is deleted. The member-side terminal computer 12 recognizes the faces of persons 204 in front of the camera 24 based on the input from the video camera 24 and the downloaded program to identify these persons to identify the member contractant. Based on the eye movement of the person, the visual line is recognized to count the watch time during which the advertisement video data (e.g., animation) displayed on the screen 22 of the terminal computer 12 is watched. Based on the face expression, the emotion or interest of the person is recognized. Based on the gesture, the accedence, rejection, or question for example is recognized. Through the input from the microphone 26, the voice or emotion of the person is recognized.

Figure 14:
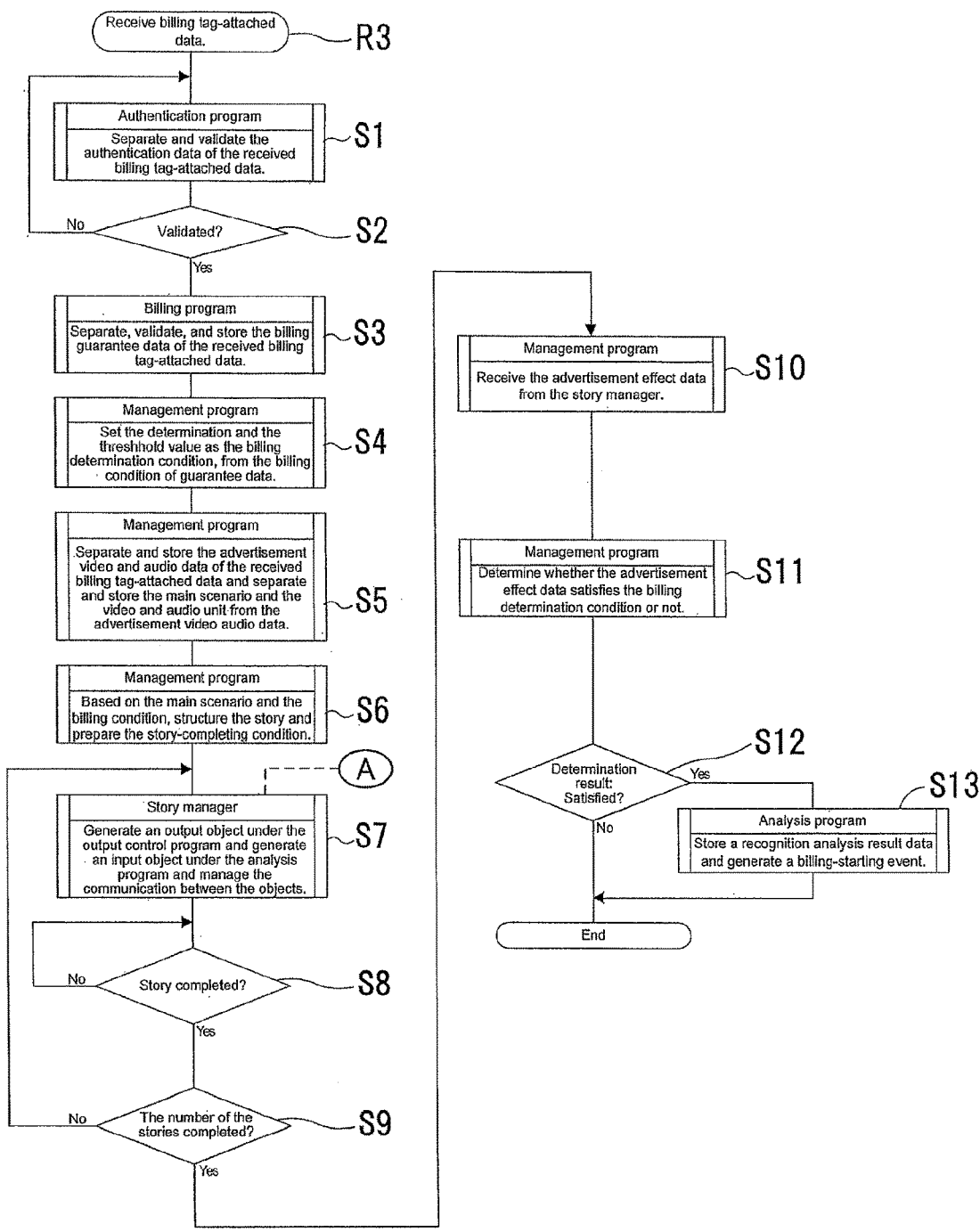
FIG. 14 is a flowchart illustrating the operation of the present invention.

Next, the following section will describe the operation to process the corrected billing tag-attached data reception of the member-side terminal computer 12 with reference to FIG. 14.

In FIG. 14, the terminal computer 12 starts the operation to process the billing tag-attached data reception from the label R3.

When the terminal computer 12 starts the data reception processing, an authentication program 124 in Step S1 separates and verifies the authentication data 48 of the received corrected billing tag-attached data 28. Next, in Step S2, the authentication program 124 determines whether the authentication data 48 is verified or not. When Step S2 determines "Yes", then a billing program 126 in Step S3 separates, verifies, and stores the billing guarantee data 52 of the received corrected billing tag-attached data.

Next, in Step S4, an administration program 128 sets a determination item and a threshold value as a billing determination condition based on the corrected billing condition of the billing guarantee data 52. Next, in Step S5, the administration program 128 separates and stores the advertisement video/audio data 56 of the received corrected billing tag-attached data 28 and separates the main scenario 60 and the video/audio unit data 62 from the advertisement video/audio data 56 to store the main scenario 60 and the video/audio unit data 62. Next, in Step S6, the administration program 128 builds a story based on the main scenario 60 and the corrected billing condition. In Step S7, based on the unit data 62, an output object is generated under an output control program 130. Based on the video/audio input, an input object is generated under an analysis program 132. The communication between these objects is administered. The input object is generated by subjecting the input video data of the camera 24 to the recognition analysis. A method of generating an output object and an input object based on the output data and the input data is a conventionally-known program technique (see Patent Publication 2). In this embodiment, a conventionally-known program generation technique is used. A program part responsible for the object generation/control of the administration program 128 is conveniently called a story manager.

The processing of Step S7 will be described in detail with reference to the flowchart shown in FIG. 15.

Figure 15:
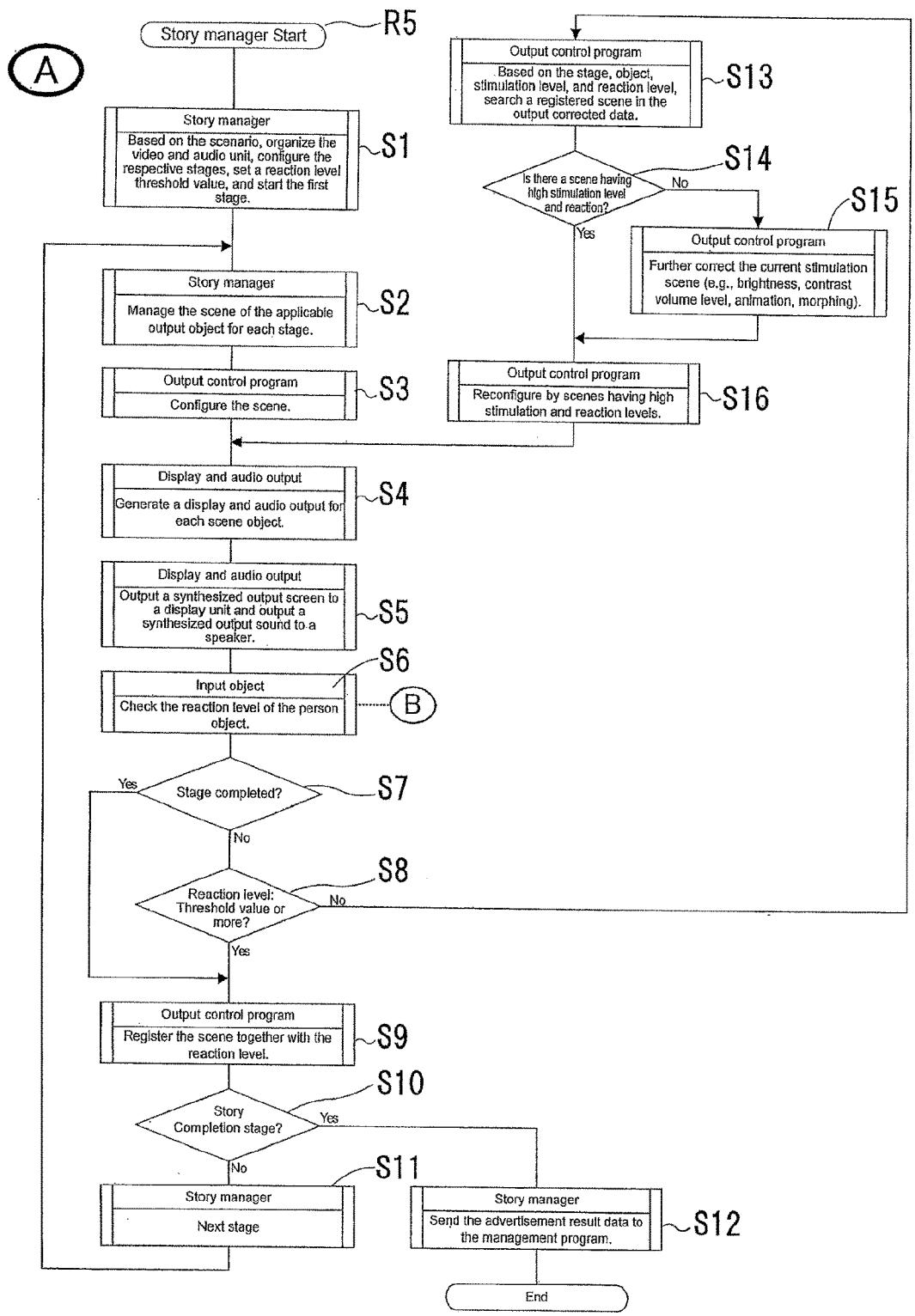
FIG. 15 is a flowchart illustrating the operation of the present invention.

Step S7 shown in FIG. 14 is started from the label R5 of FIG. 15. The administration program 128 in Step S1 combines the video/audio units 62 based on the scenario to configure the respective stages and to set the reactivity threshold values to thereby start the first stage. Next, in Step S2, an output object scene applied to each stage is administered. Next, in Step S2, the output control program 130 configures the scene. Next, in Step S3, a display/sound output program 134 generates the display/sound output for each scene object. Next, in Step S5, the display/sound output program 134 outputs a synthesized screen to the display input section 22 and outputs synthesized output sound to the speaker 20.

Next, in Step S6, the administration program 128 checks the reactivity of the person object (input object) generated by the analysis program 132. The term "reactivity" means a screen watch time for example. Next, in Step S7, the output control program 130 determines whether the stage was completed or not. When Step S7 determines "Yes", the processing proceeds to Step S9. When Step S7 determines "No", Step S8 determines whether the reactivity has a value equal to or higher than the threshold value or not. When Step S8 determines "Yes", the processing proceeds to Step S9. When Step S8 determines "No", the output control program 130 in Step S13 searches the output correction data 106 for the appearance scene based on the stage, object, stimulation level, and reactivity.

Next, in Step S14, the output control program 130 determines whether the output correction data 106 includes therein a scene having a high stimulation level or reactivity. When Step S14 determines "No", brightness, contrast, sound volume, or animation morphing for example is changed to further correct the current stimulation scene. Then, the processing proceeds to Step S16. When Step S14 determines "Yes", the output control program 130 in Step S16 rebuilds the story in a scene having a high stimulation level or reactivity. Then, the processing proceeds to Step S4. When Step S8 determines "Yes", the output control program 130 registers the scene together with the reactivity as the output correction data 106. Next, in Step S10, the output control program 130 determines whether the story is at the completion stage or not. When Step S10 determines "No", Step S11 starts the next stage. Then, the processing proceeds to Step S2. When Step S10 determines "Yes", Step S12 generates the advertisement effect data 100 (i.e., a log including the screen watch time of the person object) to send this data to the administration program 128, thereby completing the processing. In the above operation of Step S6 to check the reactivity of the person object, the face recognition processing and the face tracking processing are executed in parallel.

Figure 16:
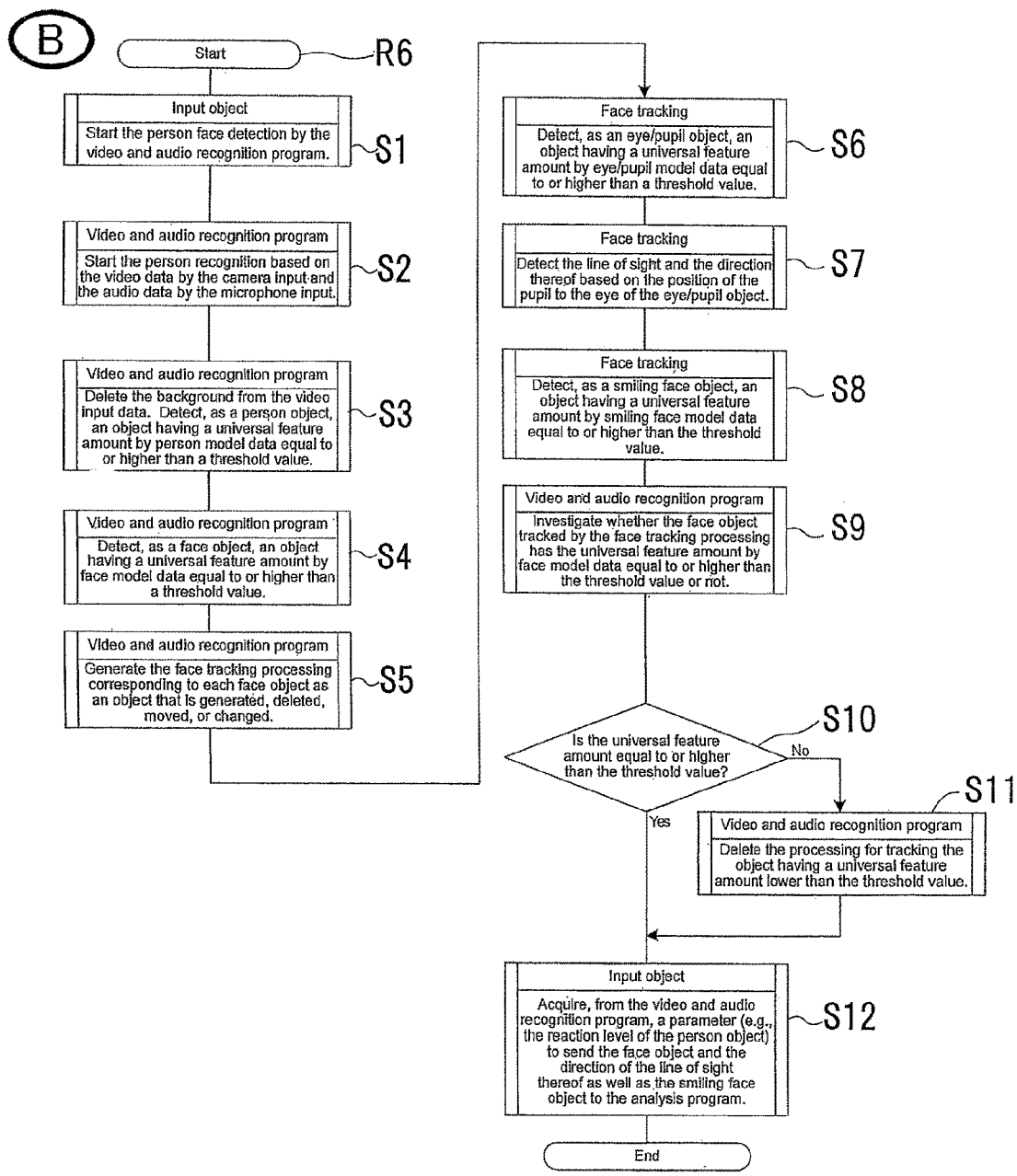
FIG. 16 is a flowchart illustrating the operation of the present invention.

Next, the following section will describe the operations of the face recognition and the face tracking processing with reference to the flowchart shown in FIG. 16.

When the face recognition/tracking processing is started from the label R6, the processing is started by the video/audio recognition program 136 to detect the face of the person (Step S1). Next, in Step S2, the video/audio recognition program 136 starts the person recognition processing based on the video data from the camera input and the audio data from the microphone input. Next, in Step S3, the background is deleted from the video input data. Then, an object having the universal feature amount based on the person model data equal to or higher than the threshold value is detected as a person object. Next, in Step S4, an object having the universal feature amount based on the face model data equal to or higher than the threshold value is detected as a face object.

Next, in Step S5, a face tracking processing is generated to correspond to the respective face objects that occur, disappear, move, or change. This parallel face tracking processing in Step S6 detects, as an eye/pupil object, such an object that has the universal feature amount based on the eye/pupil model data equal to or higher than the threshold value. Next, the face tracking processing in Step S7 detects the visual line and the direction thereof based on the position of the pupil to the eye in the eye/pupil object. Next, in Step S8 the face tracking processing detects, as a smiling face object, such an object that has the universal feature amount based on the smiling face model data equal to or higher than the threshold value. Next, in Step S9, the video/audio recognition program 136 investigates whether the face object tracked by the face tracking processing has the universal feature amount based on the face model data equal to or higher than the threshold value or not. In Step S10, the video/audio recognition program 136 determines whether the universal feature amount of the face object is equal to or higher than the threshold value or not. When Step S10 determines "No", Step S11 deletes the processing to track an object lower than the threshold value and the processing proceeds to Step S12.

When Step S10 determines "Yes", in Step S12, administration program 28 acquires, from the video/audio recognition program, a parameter (e.g., the reactivity of the person object) and provides the face object and the visual line direction thereof as well as the smiling face object to the analysis program 132, thereby completing the processing. Next, with reference to FIG. 14 again, the processings after Step S8 will be described.

In Step S8, the administration program 128 determines whether the story is completed or not. When Step S8 determines "Yes", then Step S9 determines whether the story number is completed or not. When Step S9 determines "No", the processing returns to Step S7. When Step S9 determines "Yes", the processing proceeds to Step S10.

In Step S10, the administration program 128 receives the advertisement result data 100 from the story manager. Step S11 determines whether or not the advertisement result data 100 satisfies the corrected billing condition (e.g., a screen watch time). Next, Step S12 determines whether the determination result is satisfactory or not. When Step S12 determines "Yes", the analysis program 132 in Step S13 stores analyzed recognition analysis result data 138 based on video/audio recognition data 140 and a billing start event is generated. When Step S12 determines "No", the processing is completed.

Figure 17:
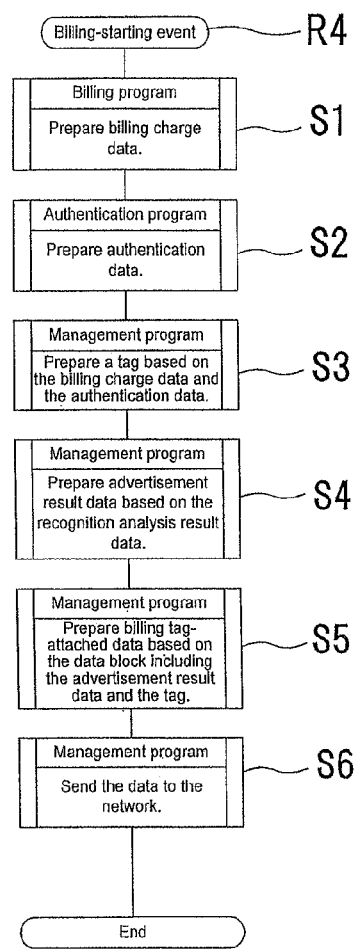
FIG. 17 is a flowchart illustrating the operation of the present invention.

Next, with reference to FIG. 17, the following section will describe the corrected billing tag-attached data transmission processing of the member-side terminal computer 6.

When the billing start event is started from the label R4, the billing program 126 in Step S1 prepares the billing charge data 90. Next, in Step S2, the authentication program 124 prepares the authentication data 86. Next, in Step S3, the administration program 128 prepares the tag 74 based on the billing charge data 90 and the authentication data 86. Next, in Step S4, the administration program 128 prepares the advertisement result data 100 based on the recognition analysis result data 138. Next, in Step S5, the administration program 128 prepares the corrected billing tag-attached data 30 based on the data block 76 including the advertisement result data 100 and the tag 74. Next, in Step S6, the administration program 128 sends the corrected billing tag-attached data 30 to the advertisement agency-side administration computer 1 via the network, thereby completing the processing.

The advertisement agency-side administration computer 1 counts the corrected billing tag-attached data 31 from the respective member-side terminal computers 12 based on the counting program 6. When the counting data satisfies the billing condition, the billing tag-attached data 30 is sent via the network 2 to the billing adjustment system of the advertiser-side computer 13, thereby completing the processing.

DESCRIPTION OF REFERENCE NUMERALS

1 Administration computer
2 Internet
3 Website building program
4 Billing tag-attached electronic advertisement data preparation program
6 Counting program
7 Corrected billing tag-attached data reception processing program
8 Billing tag processing program
9 Member list database
10 Corrected billing tag preparation program
11 Billing electronic advertisement website
12 Member-side terminal computer
13 Advertiser-side computer
14 Advertisement video preparation agency-side computer
15 CPU
20 Speaker
22 video display input section
24 Video camera
26 Microphone
28 Tag-attached electronic advertisement data
29 Tag-attached electronic advertisement data
30 Tag-attached data
31 Tag-attached data
32 Unique word
34 Tag
35 Corrected tag
36 Data block
38 Header
40 Authentication data section
42 Unique word
44 Tag
46 Data block
48 Authentication data section
50 Billing charge data section
52 Tag check code
54 Header
56 Authentication data
58 Header
60 Billing charge data
62 Header
64 Advertisement result data section
66 Data block check code
68 Header
70 Data
72 Unique word
74 Tag
76 Data block
78 Authentication data section
80 Billing charge data section
82 Tag check code
84 Header
86 Authentication data
88 Header
90 Billing charge data
92 Header
94 Advertisement result data
96 Data block check code
98 Header
100 Advertisement result data 102 Video/audio recognition data
104 Recognition analysis data
106 Output analysis data
108 Output data
110 Story information
112 Administration program
114 Video/audio preparation program
116 Scenario preparation program
118 Billing program
120 Authentication program
122 Result verification program
124 Authentication program
126 Billing program
128 Administration program
130 Output control program
132 Analysis program
134 Display/sound output program
136 Video/audio recognition program
138 Recognition analysis result data
140 Video/audio recognition data
142 Initial screen

What is claimed is:

1. A billing electronic advertisement system, comprising:
an advertiser-side computer that generates and outputs billing tag-attached electronic advertisement data, the billing tag-attached electronic advertisement data including a tag with information describing a billing condition;
a plurality of member-side terminal computers each including an electronic device that acquires a situation in front of a screen as input data; and
an advertisement agency-side administration computer that receives the billing tag-attached electronic advertisement data and generates and outputs a corrected billing tag obtained by deleting a counting part from the billing condition,
wherein the advertiser-side computer, the plurality of member-side terminal computers and the advertisement agency-side computer are connected via an Internet and, under the control by the advertisement agency-side administration computer, the billing tag-attached electronic advertisement data outputted from the advertiser-side computer is added with the corrected billing tag and a resultant data is sent to a member-side terminal computer and electronic advertisement data based on the resultant data is displayed on the screen of the member-side terminal computer,
the member-side terminal computer includes a video camera as the electronic device and an advertisement data reception processing program stored on a non-transitory computer-readable recording medium which when executed by the member-side terminal computer processes the electronic advertisement data, the advertisement data reception processing program including an input video analysis means and being downloaded from the advertisement agency-side administration computer, and the member-side terminal computer determines whether the corrected billing condition of the received electronic advertisement data is achieved or not by analyzing the input data from the electronic device,
the member-side terminal computer uses the advertisement data reception processing program to recognize a line of sight of a person in front of the video camera and count a watch time by the person of the advertisement data displayed on the screen of the member-side terminal computer, and
the advertisement agency-side administration computer includes a program stored on a non-transitory recording medium which when executed by the advertisement agency-side administration computer collects corrected billing condition determination data sent from the member-side terminal computer to determine whether the billing condition of the electronic advertisement data is achieved or not and, when the billing condition is achieved, generates billing charge data that is to be processed by the advertiser-side computer.

2. The billing electronic advertisement system according to claim 1, wherein a billing tag-attached electronic advertisement data preparation program for preparing the billing tag-attached electronic advertisement data is provided at a website of the advertisement agency-side administration computer and the billing tag-attached electronic advertisement data preparation program is downloaded from the website to the advertiser-side computer.

3. The billing electronic advertisement system according to claim 2, wherein the website of the advertisement agency-side administration computer has a billing charge data adjustment program to process the billing charge data to adjust the billing described in the data and the billing charge data adjustment program is downloaded from the website to the advertiser-side computer.

4. The billing electronic advertisement system according to claim 2, wherein the website of the advertisement agency-side administration computer has the advertisement data reception processing program that has the input video analysis means and that processes the corrected billing tag-attached advertisement data and the advertisement data reception processing program is downloaded from the website to the member-side terminal computer.

5. The billing electronic advertisement system according to claim 2, wherein the member-side terminal computer is registered in a member list database of the website of the advertisement agency-side administration computer.

6. The billing electronic advertisement system according to claim 1, wherein the billing condition is that an electronic advertisement data display screen of the member-side terminal computer is watched by a computer owner for a predetermined time or more and a number of member-side terminal computers satisfying the watch time exceeds a predetermined number.

7. The billing electronic advertisement system according to claim 1, wherein the corrected billing condition is that an electronic advertisement data display screen of the member-side terminal computer is watched by a computer owner for a predetermined time or more.

* * * * *